(12) United States Patent
Schlaudraff

(10) Patent No.: US 6,431,977 B1
(45) Date of Patent: Aug. 13, 2002

(54) AIR INLET FOR A HEATING OR AIR CONDITIONING INSTALLATION IN AN MOTOR VEHICLE

(75) Inventor: Ernst Schlaudraff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/581,849

(22) PCT Filed: Dec. 3, 1998

(86) PCT No.: PCT/EP98/07869

§ 371 (c)(1),
(2), (4) Date: Aug. 22, 2000

(87) PCT Pub. No.: WO99/32310

PCT Pub. Date: Jul. 1, 1999

(30) Foreign Application Priority Data

Dec. 18, 1997 (DE) .......................... 197 56 346

(51) Int. Cl.[7] .................................. B60H 1/30
(52) U.S. Cl. ........................................ 454/146
(58) Field of Search ................. 454/146, 149, 454/121, 148

(56) References Cited

U.S. PATENT DOCUMENTS 4,953,449 A * 9/1990 Jackson ...................... 454/146
5,632,673 A 5/1997 DeRees ....................... 454/121

FOREIGN PATENT DOCUMENTS

| DE | 1 755 585 | 11/1971 |
|---|---|---|
| DE | 40 06 208 | 8/1991 |
| DE | 44 14 036 | 10/1995 |
| EP | 0 301 494 | 2/1989 |
| FR | 1 165 665 | 10/1958 |
| FR | 1 398 105 | 8/1965 |
| FR | 0 419 313 | 3/1991 |
| GB | 922 894 | 4/1963 |

* cited by examiner

Primary Examiner—Harold Joyce
Assistant Examiner—Derek S. Boles
(74) Attorney, Agent, or Firm—Crowell & Moring LLP

(57) ABSTRACT

In the cowl of a motor vehicle, partitioning walls are provided by means of which the air inlet opening for a heating or air-conditioning system is partitioned off from the ram pressure in the area below the windshield which occurs during the drive of the vehicle. Partitioning wall, in addition, causes an insulation of the air inlet opening with respect to air flows transversely to the driving direction. By means of the partitioning according to the invention, a reduction is achieved of the dependence of the air throughput in the vehicle interior on the driving speed.

14 Claims, 2 Drawing Sheets

AIR INLET FOR A HEATING OR AIR CONDITIONING INSTALLATION IN AN MOTOR VEHICLE

BACKGROUND AND SUMMARY OF THE INVENTION

The invention relates to an air inlet for a heating or air-conditioning system of a motor vehicle having at least one air inlet opening which is arranged in an area below a windshield in which a ram pressure occurs during the drive of the motor vehicle. Certain embodiments relate to such system having at least one air inlet opening which, in an area below a windshield, is arranged laterally of a vehicle center plane.

In the case of the known air inlets, a blower is used when the vehicle is stopped and at a low speed of the vehicle in order to generate an air throughput in the interior of the motor vehicle, while, as the driving speed increases, a ram pressure is generated in the area below the windshield—the so-called cowl—by means of which ram pressure the outside air automatically enters the heating or air-conditioning system. This ram pressure is a function of the speed, so that, at higher vehicle speeds, the air inlet must be throttled in order to counteract undesirably high flow rates in the vehicle interior. The throttling can take place manually, as known, for example, from German Patent Document DE 44 14 036 A1 (corresponding to U.S. Pat. No. 5,645,479), or by means of an automatic speed-dependent control. The throttling causes additional expenditures, particularly in the case of the automatic control which is to be preferred for reasons of comfort and where precise low-hysteresis kinematics are required in order to achieve a precisely reproducible position of the throttle valve because only very small passage cross-sections remain at high vehicle speeds. In addition, the cross-sections, which are highly throttled at higher vehicle speeds, may be the starting point of noises in the air inlet area.

In many vehicles, the air inlets are arranged in the lateral frame area of the windshield because a lower ram pressure occurs here, as illustrated, for example, in the representation of FIGS. 1 and 2 of French Patent Document FR 1,165,665 A. Nevertheless, at higher vehicle speeds, as a rule the ram pressure is so high also in the case of exterior air inlets that a throttling is required.

It is an object of the invention to provide a simply constructed air inlet for a motor vehicle, in the case of which the ram pressure is essentially independent of the vehicle speed.

This object is achieved according to certain preferred embodiments of the invention by providing an air inlet for a heating or air-conditioning system of a motor vehicle, having at least one air inlet opening which is arranged in an area below a windshield in which a ram pressure occurs during the drive of the motor vehicle, wherein a device is provided which partitions off the air inlet opening with respect to an area with a relatively high ram pressure and simultaneously causes the air supply from an area of the motor vehicle in which a relatively low pressure exists during the drive of the motor vehicle. This object is achieved according to other preferred embodiments by providing an air inlet for a heating or air-conditioning system of a motor vehicle, having at least one air inlet opening which, in an area below a windshield, is arranged laterally of a vehicle center plane, wherein a device is provided between the air inlet opening and the vehicle center plane, which device partitions off the air inlet opening with respect to air flows extending approximately transversely to a vehicle forward driving direction.

According to certain embodiments of the invention, the air inlet opening is insulated with respect to the area in which an excess pressure toward the vehicle interior forms during the drive of the motor vehicle, and the outside air is fed from an area with a low pressure level, such as the lateral area of the cowl of the vehicle body where, during the driving of the motor vehicle, a lower ram pressure occurs with respect to the vehicle interior (see French Patent Document FR 1,165,665 A). As the result, the pressure level at the air inlet opening is reduced, so that, as the vehicle speed rises, the air throughput does not increase or increases only relatively slightly. In view of the fact that, at higher driving speeds, a slightly increased air throughput is even desirable, in the case of the air inlet according to the invention, a ram air flap can be eliminated.

The system according to the invention comprises, for example, of a covering over the air inlet opening which is open only toward a side area of the vehicle body.

In modern motor vehicles, the air inlet openings are often situated in a covered manner in the area below the rearward end sections of the front flap. In the case of certain preferred embodiments of the invention, the invention can be implemented in a particularly simple manner by inserting a separating wall for sealing off the gap between the front flap and the windshield. Naturally, a partition of the duct cross-section toward the vehicle center is also required in order to insulate the air inlet opening with respect to this area of a high ram pressure. The partition according to the invention is hardly visible from outside the vehicle and can be provided at low expenditures in the case of new vehicle models as well as retrofitted in the case of existing vehicles.

Below the rearward end section of the front flap, the windshield wipers for cleaning the windshield are in many cases arranged in a hidden manner. In the case of windshield wipers constructed in pairs, the driving axis of the driver-side wiper is as a rule arranged on the exterior of the vehicle so that, in the case of a construction of the invention according to certain preferred embodiments, the partition extending above the air inlet opening must be provided with openings for the passing-through of the windshield wiper. In certain preferred embodiments, it is provided that an air inlet on the driver side be eliminated and a correspondingly dimensioned air inlet be provided only on the front passenger side.

While naturally a flow extending approximately in the driving direction flows against the center area of the windshield of a motor vehicle and the air flow flows off almost completely via the vehicle roof, so that the highest ram pressure occurs in the center below the windshield, a lateral flow also increasingly takes place around the lateral areas of the windshield because the air flow flows partially off in the direction of the vehicle side areas. As a result, a decreasing ram pressure occurs in the direction of the exterior side of the vehicle. As a result of the pressure difference between the vehicle center and the exterior side of the vehicle, an air flow extending transversely to the driving direction occurs in the area below the windshield. Here preferred embodiments of the invention provide a device for partitioning off this flow extending transversely to the driving direction. As a result, an exterior air inlet opening is insulated from the "transverse flow" and thus a clear reduction is achieved of the dependence of the air throughput in the heating or air-condition system from the driving speed.

In the case of motor vehicles whose air inlet openings are arranged in a hidden manner in the area below the rearward end sections of the front flap, preferred embodiments of the invention can be implemented in a particularly simple manner by inserting a transverse wall into the duct below the windshield formed by the front-flap and other adjacent components. This division of the duct is hardly visible from outside the vehicle and can be provided at low expenditures in the case of new vehicle models as well as retrofitted in the case of existing vehicles.

In addition to the partitioning walls according to the above described embodiments, further partitioning can be provided, for example, if the air inlet opening is not situated sufficiently far on the exterior side of the vehicle. Such additional partitioning walls also prevent backflows from the windshield and disturbing air swirls at the air inlet opening.

By means of a further development of preferred embodiments of the invention wherein the device is provided with a sealing device in an area in which displaceable connection parts adjoin the device, an improved sealing-off of the air inlet area is achieved, particularly with respect to a displaceable front flap.

According to the type of the motor vehicle, under certain circumstances, a relatively high pressure level may also still exist in the lateral areas of the cowl. In such cases, a further advantageous development of preferred embodiments of the invention, wherein the air inlet opening is connected with an area of the motor vehicle in which a vacuum occurs during the drive of the motor vehicle, according to which a connection can be established to a lateral area of the vehicle body of the motor vehicle. As generally known and also illustrated in French Patent Document FR 1 165 665 A, FIG. 1, during the drive of the motor vehicle, a vacuum is present at the lateral surfaces of the vehicle body. By means of the coupling of this area of the air inlet opening according to the invention to this lateral area (or another area with a low pressure level), the pressure level at the air inlet opening is significantly lowered. As a vacuum-carrying area, the area of the door gap at the A-column can, for example, be used. In the case of vehicles, particularly sportscars, which have recesses (so-called "gills") in the lateral area of the fenders, this area of the fender can also be connected with the air inlet. As a rule, the coupling to the lateral area of the vehicle body takes place by correspondingly designed vehicle body parts and sealing devices. As an alternative to such a duct "built" by means of correspondingly shaped motor vehicle parts, for example, a separate tube can also establish the connection to the lateral areas of the vehicle body.

A possible embodiment of the invention is illustrated in the drawing and will be explained in detail in the following.

Other objects, advantages and novel features of the present invention will become apparent from the following detailed description of the invention when considered in conjunction with the accompanying drawings.

DETAILED DESCRIPTION OF THE INVENTION

Figure 1:
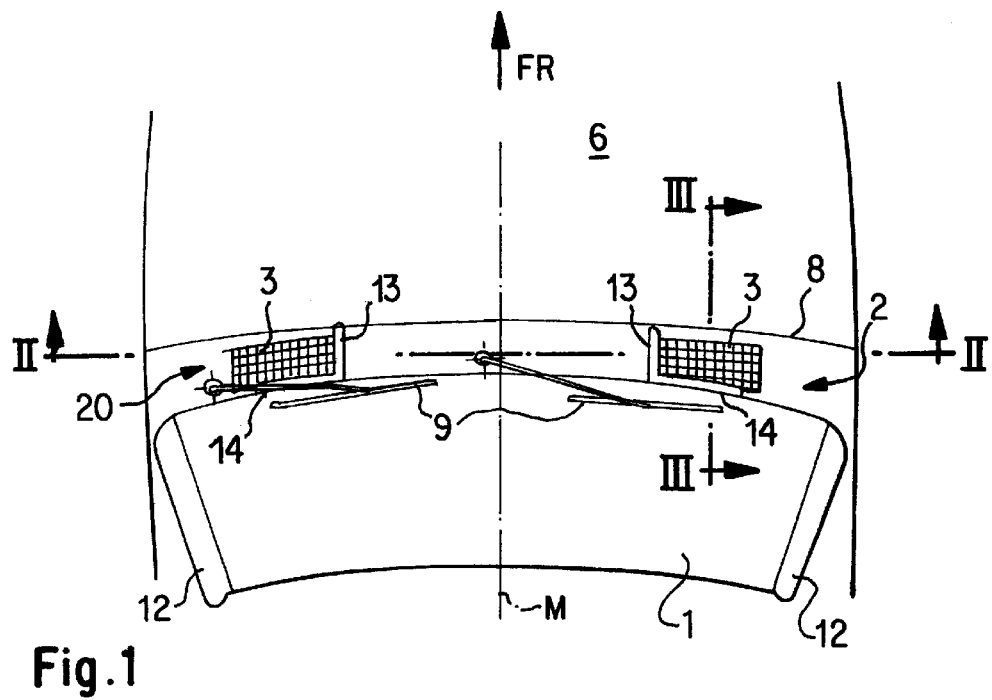
FIG. 1 is a top schematic view of a motor vehicle with a first embodiment of an air inlet according to the invention for a heating or air-conditioning system.

FIG. 1 is a top view of the: forward area of a motor vehicle (without front flap 7). The driving direction of the vehicle is indicated by the arrow FR. The cowl 2 with air inlet grids 3 arranged symmetrically with respect to the longitudinal center plane M of the vehicle is situated in the area below a windshield 1. As illustrated particularly in FIG. 3, the cowl 2 is bounded by the windshield 1, a cowl panel 4, a separating wall 5 with respect to the engine compartment as well as a front flap 7 which is folded down in FIG. 3. An engine compartment sealing device 8 ensures the sealing-off of the air inlet area with respect to undesired emissions from the engine compartment 6. In addition, windshield wipers 9 are arranged in the cowl 2. An air collection space 10 which, with respect to the vehicle interior, is bounded by a forward front wall is situated below the air inlet area. The windshield 1 is laterally bordered by the A-columns 12.

According to the invention, a partitioning wall 13, which extends approximately in parallel to the longitudinal center plane M, is situated in the cowl 2 in each case at the interior edge areas of the air inlet grids 3. By means of this partitioning wall 13 the air inlet area is insulated with respect to transverse flows which occur in the cowl 2 when the air stream flows against the vehicle. In addition, partitioning walls 14 are provided which extend approximately perpendicularly with respect to the windshield 1. On their end sections facing the front flap 7, the partitioning walls 13 and 14 have elastic sealing profiles 15. As a result, the partitioning walls 13 and 14, together with the cowl panel 4, the separating wall 5 and the front flap 7, each form a "funnel" or semi-open duct 20 for the two air inlet openings 3 which is closed in the direction of the vehicle center plane M. The inflow of air can therefore take place only by way of the lateral areas 18 of the cowl 2. By means of sealing devices 16 (indicated by a broken line in FIG. 2), the cowl 2 is insulated with respect to a lateral area 17 of the vehicle body, such as a door gap along the A-column of the motor vehicle. In the case of motor vehicles in which a relatively high ram pressure exists also in the edge area 18 of the cowl 2, the sealing device 16 may have an interruption or be completely absent in order to couple the air inlet opening 3 to the vacuum-carrying lateral area 17 of the vehicle body.

Figure 2:
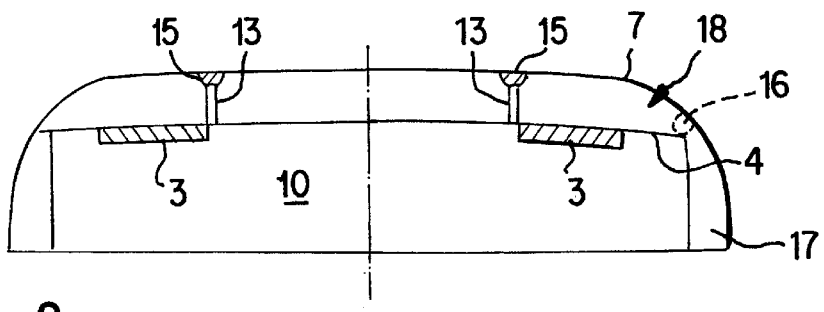
FIG. 2 is a sectional view taken along section Line II—II in FIG. 1.
Figure 3:
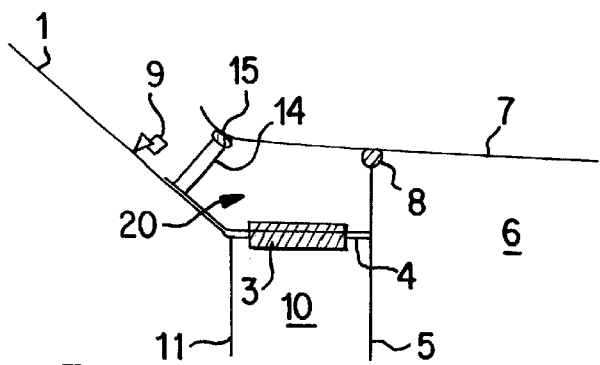
FIG. 3 is a sectional view taken along section Line III–III in FIG. 1.
Figure 4:
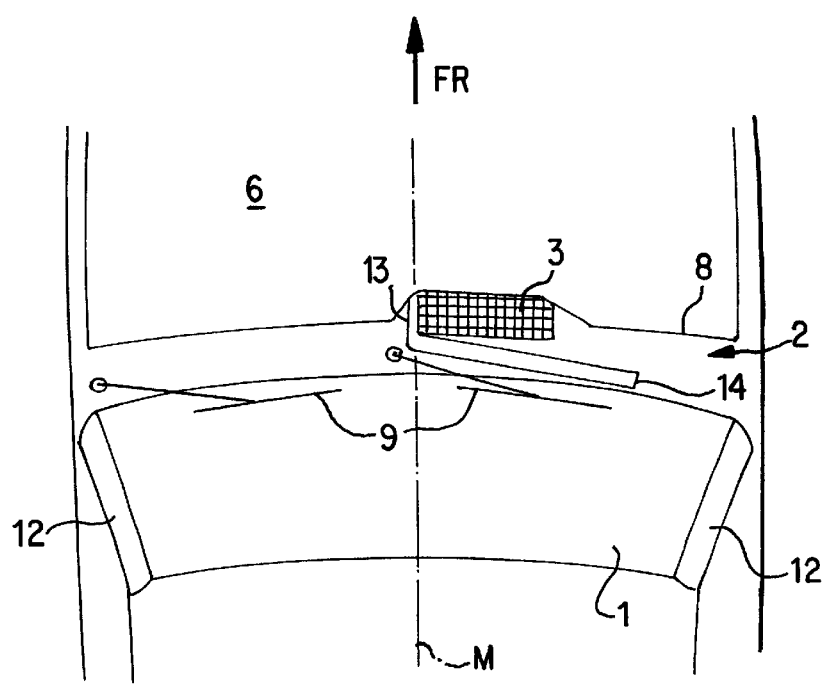
FIG. 4 is a top view of a motor vehicle with a second embodiment of an air inlet according to the invention.

As illustrated in FIGS. 1 to 3, in many cases, the air inlet area is arranged as far as possible on the outside of the vehicle, because a lower pressure level exists here than in the area of the vehicle center. Deviating therefrom, FIG. 4 shows a cutout of a vehicle with an approximately central air inlet opening 3. Identical parts and identically operating parts have the same reference numbers here as in the preceding figures. Together with the components of the cowl 2 and of the front flap not illustrated in FIG. 4, the partitioning walls 13 and 14 form a "funnel" which is open only toward the right exterior side of the vehicle. The partitioning wall 14, which closes off the gap between the windshield 1 and the front flap, in this case, extends beyond the width of the air inlet opening 3 in the direction of the exterior side of the vehicle, so that opening of the "funnel" is displaced into an area of a lower pressure level. Because of the larger clearance for the partitioning wall 14 (moving path of the windshield wiper 9), the air inlet opening 3 is situated on the front passenger side.

Figure 5:
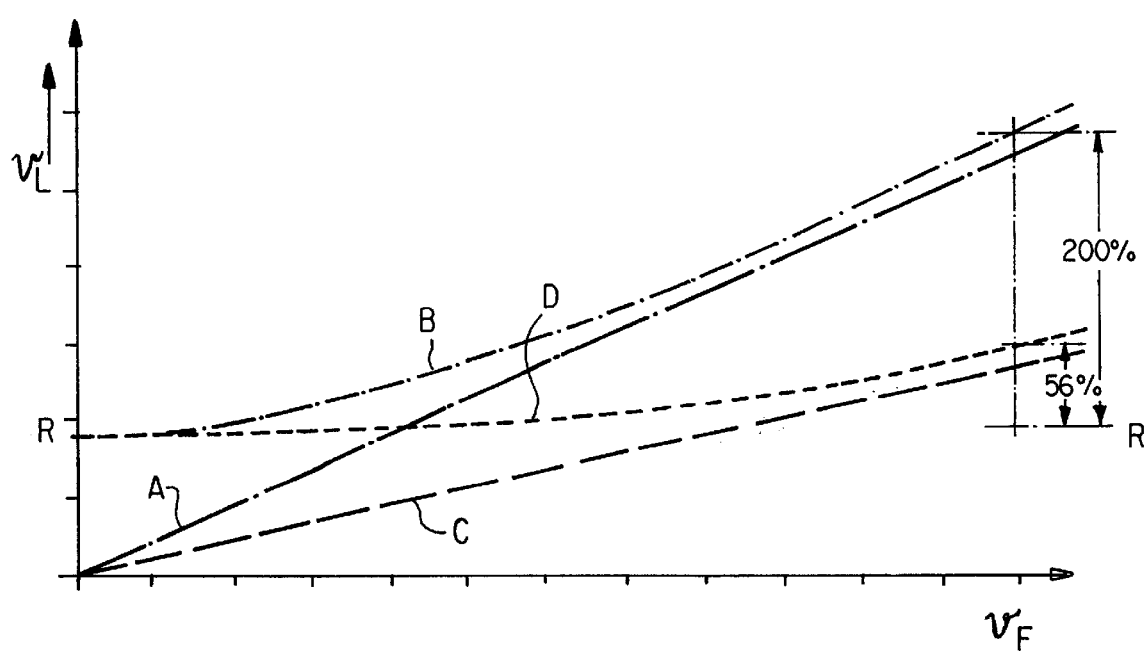
FIG. 5 is a graphical representation of the flow rate of the air flowing out of the heating or air-conditioning system, without and with the air inlet constructed according to the invention, as a function of the vehicle speed.

FIG. 5 shows the effectiveness of the invention by means of measured curve courses of the air velocity $v_L$ at heating air outlets in the vehicle interior over the vehicle speed $v_F$. Curves A and B indicate the air velocity $v_L$ in the case of a conventional vehicle, curve A indicating the dependence on the vehicle speed $v_F$ when the blower is switched off, and curve B indicating the corresponding dependence when the blower of the heating or air-conditioning system is switched on (blower stage 1). Correspondingly, lines C (without blower) and D (with blower) reflect the course of the air velocity $v_L$ over the vehicle speed $v_F$ in the case of a vehicle with partitioning walls 13 and 14 according to FIGS. 1 to 3 of the invention.

Based on a reference value R (corresponding to the air velocity $v_L$ when the vehicle is stopped in blower stage 1), in the case of a conventional vehicle, an excess of 200% occurs at the maximum speed and when the blower is switched on; whereas, in the case of a vehicle according to the invention, an excess of only 56% was measured. Because of this significant reduction of the air velocity $v_L$, additional measures, particularly an automatically acting ram air throttling, can be eliminated.

The air inlet openings should generally be dimensioned such that a sufficiently large inlet cross-section is obtained for the maximal blower operation when the vehicle is stopped. If, because of vehicle-type-related situations, the air throughput should still be too large, particularly at higher speeds, despite the use of partitioning walls 13 and 14 according to the invention, a ram air flap of a simple construction can be provided which causes comparatively low expenditures and requires only a correspondingly simply constructed device for its control. Furthermore, acoustic advantages are obtained in every case because of the lower flow velocities.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air inlet for a heating or air-conditioning system of a motor vehicle, having at least one air inlet opening which is arranged in an area below the windshield in which a ram pressure occurs during a driving condition of the motor vehicle,
   wherein a partition device is provided which partitions off the air inlet opening from an area with a relatively high ram pressure and simultaneously allows air to be supplied from an area of the motor vehicle in which a relatively low pressure exists during the driving condition of the motor vehicle.
2. Air inlet according to claim 1,
   wherein the air inlet opening is arranged in a semi-open duct which is bounded upward by an end section of a front flap of the vehicle,
   wherein at least in an area above the air inlet opening, the partition device has a partitioning wall which at least partially fills a gap between the windshield and the front flap.
3. Air inlet according to claim 2,
   wherein an air inlet opening is provided only in a front-passenger-side area of the windshield.
4. Air inlet according to claim 1,
   wherein the partition device is provided with a sealing device in an area in which a front flap of the motor vehicle adjoins the partition device.
5. Air inlet according to claim 2,
   wherein the partition device is provided with a sealing device in an area in which a front flap of the motor vehicle adjoins the partition device.
6. Air inlet according to claim 1,
   wherein the air inlet opening is in fluid communication with area of the motor vehicle in which a vacuum occurs during the driving condition of the motor vehicle.
7. Air inlet according to claim 2,
   wherein the air inlet opening is in fluid communication with an area of the motor vehicle in which a vacuum occurs during the driving condition of the motor vehicle.
8. Air inlet for a heating or air-conditioning system of a motor vehicle, having at least one air inlet opening which, in an area below a windshield, is arranged laterally of a vehicle center plane,
   wherein a partition device is provided between the air inlet opening and the vehicle center plane, which device partitions off the air inlet opening from air flows extending substantially transversely to a forward driving direction of the motor vehicle.
9. Air inlet according to claim 8,
   wherein the air inlet opening is arranged in a semi-open duct which is bounded upward by an end section of the front flap of the vehicle,
   wherein the partition device is formed by a partitioning wall which fills a cross-section of the duct, and extends substantially parallel to the center plane.
10. Air inlet according to claim 8,
    wherein the partition device is provided with a sealing device in an area in which the front flap of the motor vehicle adjoins the partition device.
11. Air inlet according to claim 9,
    wherein the partition device is provided with a sealing device in an area in which the front flap of the motor vehicle adjoins the partition device.
12. Air inlet according to claim 5,
    wherein the air inlet opening is in fluid communication with an area of the motor vehicle in which a vacuum occurs during the driving condition of the motor vehicle.
13. Air inlet according to claim 9,
    wherein the air inlet opening is in fluid communication with an area of the motor vehicle in which a vacuum occurs during the driving condition of the motor vehicle.
14. A vehicle assembly comprising:
    a windshield,
    vehicle body parts forming an air inlet opening below the windshield in which area a ram pressure occurs during a driving condition of the vehicle, and
    a partitioning arrangement operable to partition an area of the air inlet opening during the driving condition of the vehicle from relatively high ram pressure and to simultaneously communicate an air supply to the air inlet opening from a vehicle area subjected to relatively low pressure during the driving condition of the vehicle.

* * * * *